United States Patent
Anderson et al.

(10) Patent No.: US 7,801,246 B2
(45) Date of Patent: *Sep. 21, 2010

(54) MULTI-MODE COMMUNICATION DEVICE FOR GENERATING CONSTANT ENVELOPE MODULATED SIGNALS USING A QUADRATURE MODULATOR

(75) Inventors: George C. Anderson, Sunrise, FL (US); Jose E. Korneluk, Lake Worth, FL (US); Gregory S. Raven, Plantation, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 935 days.

This patent is subject to a terminal disclaimer.

(21) Appl. No.: 11/618,777

(22) Filed: Dec. 30, 2006

(65) Prior Publication Data

US 2008/0159418 A1    Jul. 3, 2008

(51) Int. Cl.
*H04L 27/36* (2006.01)
(52) U.S. Cl. .................. 375/298; 375/295; 375/261; 375/219
(58) Field of Classification Search .......... 375/298, 375/219, 261, 295
See application file for complete search history.

(56) References Cited

U.S. PATENT DOCUMENTS

| 5,564,087 | A | 10/1996 | Cygan et al. |
| 5,933,767 | A | 8/1999 | Leizerovich |
| 6,418,173 | B1 | 7/2002 | Matsuoka |
| 6,831,954 | B1 | 12/2004 | Mandyam |
| 2004/0127173 | A1 | 7/2004 | Leizerovich |
| 2004/0193965 | A1 | 9/2004 | Coersmeier |
| 2005/0026570 | A1 | 2/2005 | Han |
| 2006/0098761 | A1 * | 5/2006 | Leizerovich et al. ........ 375/303 |
| 2007/0253510 | A1 | 11/2007 | Danz |
| 2008/0058003 | A1 | 3/2008 | Rydnell et al. |
| 2008/0151974 | A1 | 6/2008 | Jensen et al. |
| 2008/0160933 | A1 * | 7/2008 | Anderson et al. ........... 455/110 |

FOREIGN PATENT DOCUMENTS

| DE | 10 2004 001998 A1 | 9/2004 |
| EP | 0588444 B1 | 4/1998 |
| WO | 2005125143 A | 12/2005 |
| WO | 2006031159 A | 3/2006 |

OTHER PUBLICATIONS

Patent Cooperation Treaty, "Notification of Transmittal of the International Search Report and the Written Opinion of the International Searching Authority" for International Patent Application No. PCT/US2007/087219, Jun. 25, 2008, 13 pages.
Patent Cooperation Treaty, "Notification of Transmittal of the International Search Report and the Written Opinion of the International Searching Authority" for International Application No. PCT/US2007/087084, Sep. 12, 2008, 13 pages.
U.S. Patent and Trademark Office, "Non-Final Rejection" for U.S. Appl. No. 11/618,772, Dec. 9, 2009, 15 pages.

* cited by examiner

*Primary Examiner*—Ted M Wang
(74) *Attorney, Agent, or Firm*—Scott M. Garrett; Sylvia Chen

(57) ABSTRACT

A quadrature modulated transceiver (102) is used to generate a constant envelope angle modulated signal for communications. To produce the required feedback when operating in the constant envelope mode, an orthogonal frequency division multiplexed receiver (136) is used.

7 Claims, 3 Drawing Sheets

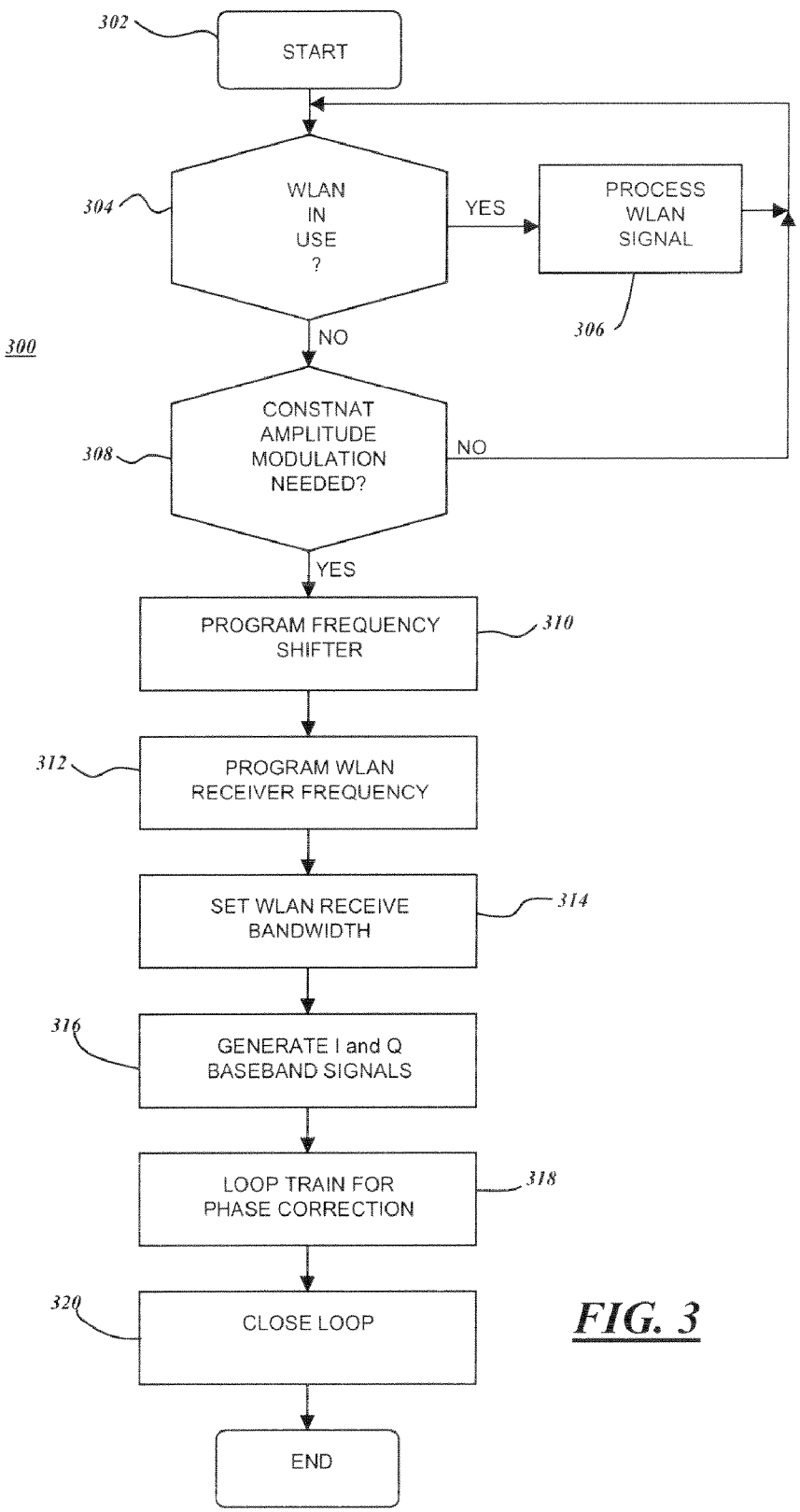

MULTI-MODE COMMUNICATION DEVICE FOR GENERATING CONSTANT ENVELOPE MODULATED SIGNALS USING A QUADRATURE MODULATOR

FIELD OF THE INVENTION

The invention relates generally to communications transmitters, and more particularly to transmitters in multi-mode communication devices having on-board OFDM transceivers for communicating with wireless local area networks.

BACKGROUND OF THE INVENTION

Mobile communication devices are increasingly common, particularly in metropolitan regions of the world. These devices have evolved from simple radio telephones to complex, multi-mode devices that may incorporate computing ability for executing applications and programs. Manufacturers have endeavored to include increased functionality in smaller volume while reducing power consumption to increase operation time for a given battery capacity.

The communications landscape has evolved as well, and there are now a variety of competing communications systems, protocols, and air interfaces offered in the marketplace. There are also different modes of communication and services available. Some manufacturers, rather than design mobile communication devices that only operate with one type of air interface and only offer one communication mode, are designing multi-mode communication devices that can access more than one type of communication system and communicate using more than one mode of communication.

In order to keep with goals of small size, weight, and low power consumption, however, manufacturers have had to design circuitry such that it can be used in as many of the different modes as possible. The fact that communication is now almost entirely digital allows much of the signal processing to be performed by processors, such as digital signal processor, according to instruction code. However, certain elements are difficult to share across different communication schemes. For example, a transmitter designed for amplitude modulation may not be a likely candidate for use with a communication protocol calling for angle modulation with a constant envelope. Typically for multi-mode devices using such diverse communication protocols manufacturers have been forced to use separate transmitters for each modulation form. This is undesirable because transmitter components may be among the more costly components in the design of a communications device. Therefore there is a need for transmitter that can support multiple communication schemes having diverse modulations schemes.

SUMMARY OF THE INVENTION

The present invention discloses in one embodiment a constant envelope IQ transmitter which includes an IQ signal source. The IQ signal source is a quadrature generator which generates an I baseband signal and a Q baseband signal from a circular IQ constellation. The embodiment further includes a summing junction which sums the I baseband signal with an I error signal to produce a corrected I signal, and which sums the Q baseband signal with an Q error signal to produce a corrected Q signal. An IQ modulator is used to quadrature modulate a carrier wave with the corrected I and Q signals to produce a constant envelope IQ modulated carrier. An amplifier amplifies the constant envelope IQ modulated carrier to produce an output signal, which is sampled via a directional coupler to produce a sampled signal. the sampled signal is fed to an orthogonal frequency division multiplexed (OFDM) transceiver module which operates in a prescribed frequency band and which produces the I error and Q error signals.

In another embodiment, the invention provides a method of generating an IQ modulated constant envelope signal in a transmitter. The method commences by generating an I baseband signal and a Q baseband signal. The I and Q baseband signals are produced by mapping an input signal to a circular IQ constellation. I and Q summing nodes are used for summing the I baseband signal with an I error signal to produce a corrected I signal, and summing the Q baseband signal with an Q error signal to produce a corrected Q signal. The corrected I and Q signals are used for modulating a carrier wave a produce a constant envelope IQ modulated carrier which is amplified to produce an output signal. The output signal is sampled and demodulated with an orthogonal frequency division multiplexed (OFDM) receiver to produce the I error and Q error signals.

In a further embodiment of the invention, the invention provides a multi-mode communication device. The multi-mode communication device includes a multi-mode transceiver having a quadrature modulator. The quadrature modulator is used for both amplitude and angle modulation according to the invention. Different forms of modulation may be required for different modes of communication, as specified by an air interface standard for each mode of communication. A Cartesian feed back path is selectably coupled between an output and a back end module of the of the multi-mode transmitter for providing quadrature feedback when the multi-mode transmitter is transmitting amplitude modulated signals. The back end module comprises digital signal processing elements and performs the summing of the feedback signals with the forward signals to produce corrected signals. The multi-mode mobile communication device further comprises a wireless local area network (WLAN) transceiver for accessing a wireless local area network, and which is selectably coupled between the output of the and the back end module of the of the multi-mode transmitter, and is used to provide quadrature feedback when the multi-mode transmitter is transmitting constant envelope angle modulated signals.

BRIEF DESCRIPTION OF THE DRAWINGS

There are shown in the drawings, embodiments which are presently preferred, it being understood, however, that the invention is not limited to the precise arrangements and instrumentalities shown.

FIG. 3 shows a flow chart diagram of operating a multi-mode mobile communication device, in accordance with an embodiment of the invention.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
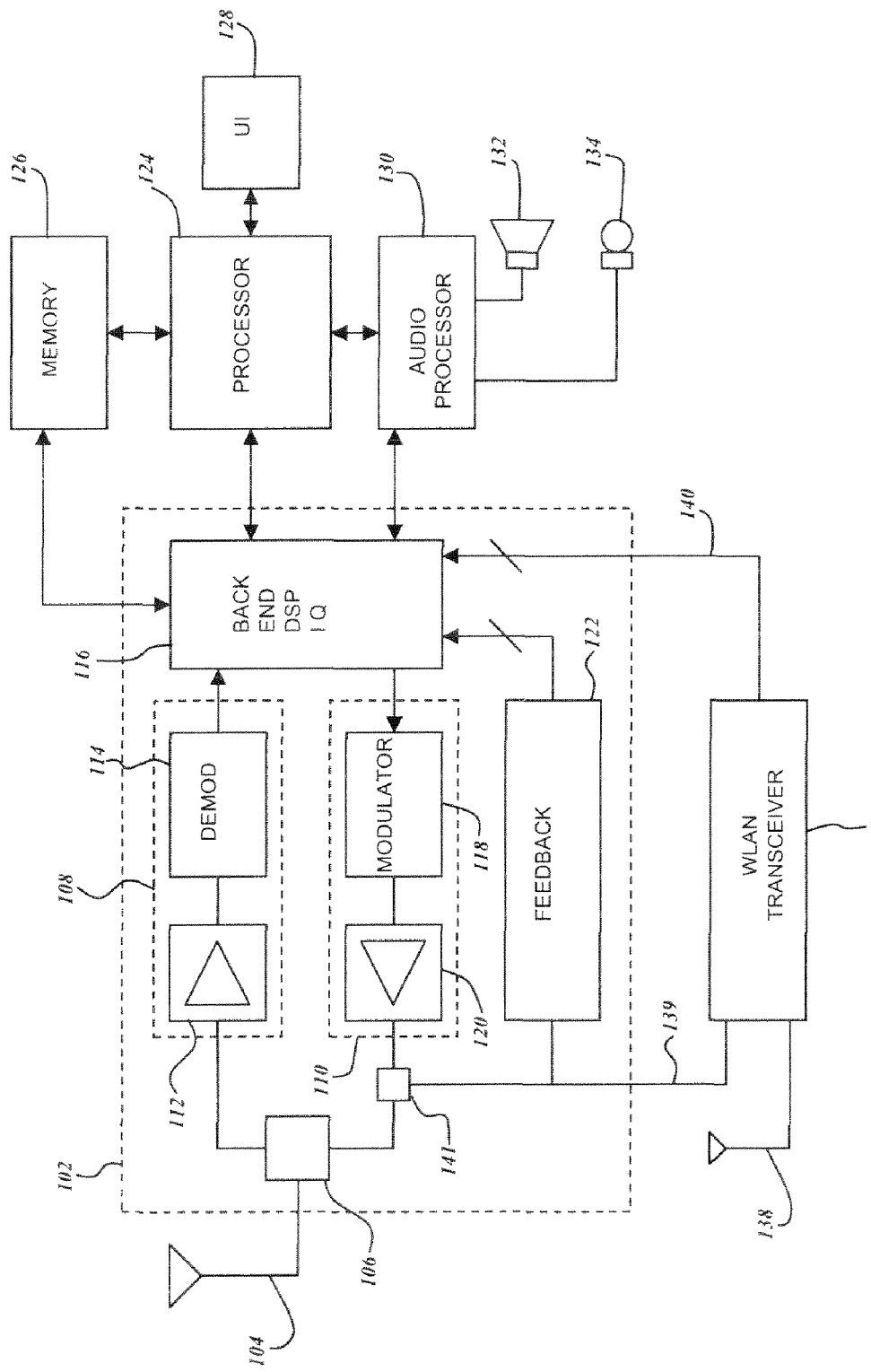
FIG. 1 shows a block schematic diagram of a multi-mode mobile communication device, in accordance with an embodiment of the invention.

Referring now to FIG. 1, there is shown a block schematic diagram of a multi-mode mobile communication device 100, in accordance with an embodiment of the invention. The multi-mode mobile communication device comprises a multi-mode communications transceiver 102 that is coupled to an antenna 104. The antenna is coupled through an isolator or switch 106 to a receiver 108 and a transmitter 110. The receiver includes an amplifier 112 such as a low noise amplifier, and a demodulator 114. The receiver amplifies a received radio frequency signal and provides the amplified signal to the demodulator, which demodulates the amplified signal. The demodulator may be a quadrature demodulator which provides I and Q baseband signals to a back end module 116 including a digital signal processor. The I and Q signals may be either analog or digital. If they are analog, the back end module will convert them to digital form for processing. The back end module processes the output of the demodulator to obtain the information transmitted by the transmitting party from which the device is receiving. The processing may include, for example, removal of error correction coding, digital filtering, decoding of encoded voice information, and so on. Similarly, the back end module prepares signals for transmission by filtering, coding, and applying forward error correction, among other operations that may be performed. The back end provides I and Q quadrature signals to a digital quadrature modulator 118. The quadrature modulator modulates a carrier with the I and Q signals to generate a modulated radio frequency signal which is provided to a radio frequency power amplifier 120. The power amplifier amplifies the signal so that it may be radiated by the antenna at a desired power level.

To suppress distortion and correct non-linearity in the amplified signal, the transmitter may employ a feedback path 122. More particularly, the feedback path 122 may be a Cartesian feedback path for quadrature amplitude modulated (QAM) signals, when the device is operating in a communications mode requiring quadrature amplitude modulation and where the envelope of the transmitted signal exhibits amplitude variation. Cartesian feedback is well known for linearizing amplitude modulated quadrature signals.

The back end module is further coupled to a processor 124 which is responsible for controlling operation of the device in accordance with instruction code it instantiates and executes. The processor and back end module are coupled to a memory 126. The memory as shown here represents an aggregate memory, and includes a variety of memory elements including storage memory, execution memory, re-programmable memory, read only memory, and so on, is well known. The processor operates a user interface 128 which may include well known user interface elements such as a graphical display, keypad and other buttons, a tactile alert generator, for example. These elements allow the user to interact with the device, receive information from the device, and enter information and commands into the device so that the device can carry out tasks desired by the user.

To facilitate voice and audio communication, the device further includes an audio processor 130. The audio processor is coupled to the processor 124 and back end module 116, and receives digital audio signals from the back end module or processor, or both, converts them to analog audio signals, and plays them over a speaker 132 or other audio transducer. The audio processor may, for example, receive volume information from the processor and adjust the volume of the audio signals being played accordingly. Similarly, the audio processor may receive analog audio signals from a microphone 134 and converts them to digital form to be processed by the back end module for transmission, voice recognition, or other audio processing.

The device, in accordance with the invention, further comprises an auxiliary transceiver, such as a wireless local area network (WLAN) transceiver 136. The WLAN transceiver is used for accessing local wireless networks, such as those specified in standards 802.11a/b/g and 802.16 of the Institute of Electrical and Electronic Engineers (IEEE). The WLAN transceiver may have it's own antenna 138 since it may operate in a frequency band that is substantially different than the band or bands used by the multi-mode transceiver communications 102, and thus may not share the antenna. The WLAN transceiver may be used for accessing data network, and may further be used for conducting "voice over IP" communication when in the presence of a conforming wireless network. Such wireless networks employ an orthogonal frequency division multiplexed (OFDM) modulation scheme.

IQ modulation, as employed in the multi-mode communications transceiver 102, is not used for constant envelope modulation because of the distortion and non-linearity introduced by the transmitter components. However, according to the invention, the WLAN transceiver may be used to provide corrective feedback such that the IQ modulator can be used for constant envelope communications, such as that specified by the Global System for Mobile (GSM) communication. The WLAN transceiver is therefore coupled to the output of the power amplifier of multi-mode transceiver, as indicated by line 139. The coupling is to the receiver of the WLAN transceiver, and will be attenuated by a coupler 141 or other attenuation means, and is preferably switchable so that the WLAN transceiver may be selectively coupled to the output of the power amplifier so as to not interfere with the operation of the WLAN transceiver when it is being used to access a WLAN. The WLAN transceiver demodulates the output of the power amplifier, and generates error signals I' and Q' which are fed back to the back end module 116 as indicated by line 140. These error signals are summed with the I and Q signals, respectively, generated at the back end module.

Figure 2:
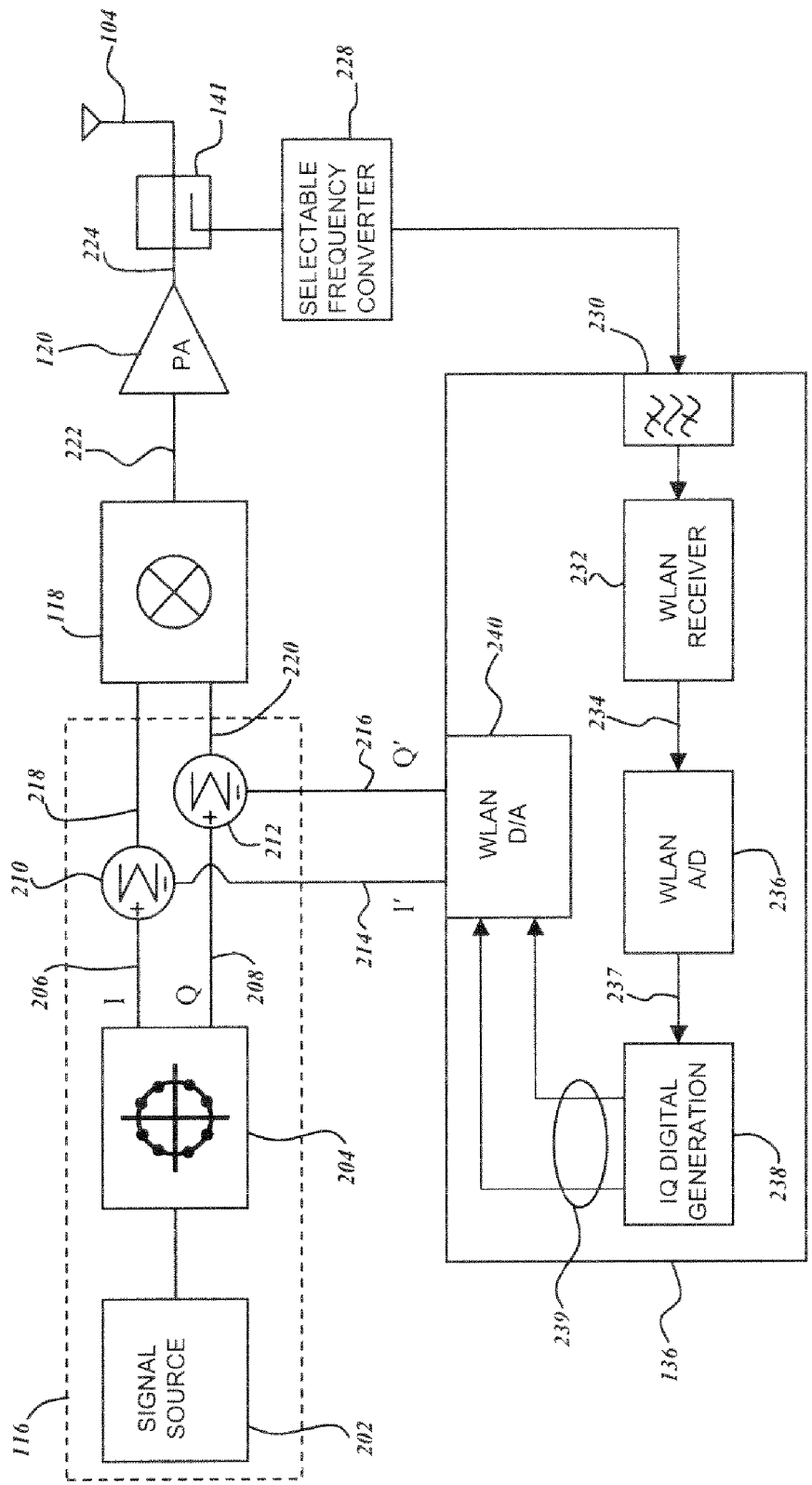
FIG. 2 shows a block schematic diagram of a transmitter arrangement for generating a constant envelope signal using IQ modulation, in accordance with an embodiment of the invention.

Referring now to FIG. 2, there is shown therein a block schematic diagram of a transmitter 200 in accordance with an embodiment of the invention. The transmitter is an IQ transmitter that is used to generate a constant envelope signal suitable for voice communication in GSM compliant communication systems. A signal source 202, such as a voice signal, provides a digital signal that is ready for transmission, meaning it has been otherwise processed, filtered, had forward error correction applied, etc., as necessary. The digital signal is mapped to an IQ constellation 204. In order to facilitate generation of the constant envelope signal, the constellation is a circular constellation, meaning every defined point is equidistant from the origin of the constellation. The output of the constellation mapping is a I baseband signal 206 and a Q baseband signal 208. These are fed to an I summer 210 and a Q summer 212, respectively. The I baseband signal is summed with an I' or I error signal 214, and the Q baseband signal is summed with a Q or Q error signal 216. The result of these summations is a corrected I signal 218 and a corrected Q signal 220. The corrected I and Q signals are fed to the quadrature or IQ modulator 118. The IQ modulator generates an IQ modulated carrier 222. The IQ modulated carrier will not be a constant envelope signal, at least not to the desired standard, and it will exhibit phase distortion as well. The effect of the feedback of the I and Q error signals is such that corrected I and Q signals are effectively predistorted in a way such that the predistortion will essentially be eliminated upon the signal being modulated and amplified such that a substantially constant envelope signal without phase distortion will be evident at the output 224 of the RFPA 120.

The output signal 224 is sampled, such as by a directional coupler 141 to provide a sampled signal 226. The sampled signal is a low level duplicate of the output signal 224. The sampled signal is fed back to the WLAN transceiver module 136. It is preferred that the sampled signal is switchably connectable to the WLAN transceiver so that when the multi-mode communications transceiver is not operating, the WLAN is not coupled to the output of the transmitter and is free to receive WLAN signals.

It is contemplated that the output signal 224 may be at a frequency outside of the frequency band in which the WLAN module can receive. WLANs typically operate in the band from 2.4 GHz to 2.485 GHz for IEEE 802.11b/g and 5.15 GHz-5.35 GHz and 5.47 GHz-5.825 GHz for IEEE 802.11a. When the output signal is not within the band of operation of the WLAN module, a frequency converter 228 may be used to shift the frequency of the sampled signal to a frequency at which the WLAN module can receive. In one embodiment the frequency converter is a harmonic generator to shift the frequency of the sampled signal to a multiple of the carrier frequency. A diode may be used to generate the harmonic, for example. The sampled signal is fed, after frequency shifting if necessary, otherwise directly to the WLAN module at a receiver input 230. The input of the WLAN module includes some filtering, and then the filtered signal is processed by a WLAN receiver 232. The WLAN receiver is programmable so that it can receiver at frequencies within the WLAN bands. The processor 124 may program the WLAN receiver such that, upon receiving the sampled signal, the output of the WLAN receiver 234 is at an intermediate frequency (IF). The IF signal is down converted and digitized by a WLAN analog to digital converter 236 to produce a digital signal 237. The digital signal 237 is processed by an IQ generator 238, which generates I and Q signals 239 in digital form. These digital I and Q signals are then converted to analog by a WLAN digital to analog converter 240, which results in the I and Q error signals I' and Q'.

In addition to programming the WLAN receiver to receive at a particular frequency or channel, the processor 124 may program the WLAN receiver to a specified bandwidth. By limiting the bandwidth of operation the WLAN receiver will require less power. Furthermore, the mobile communication device may train the feedback loop for loop phase before using the WLAN receiver feedback path in regular operation.

Thus, the transmitter as configured in FIG. 2 facilitates generating a constant envelope signal using quadrature or IQ modulation that is sufficiently constant for use with standardized voice communication in systems such as those conforming to the GSM specification. The transmitter commences generating an I baseband signal and a Q baseband signal by mapping an input signal to a circular IQ constellation. The I and Q baseband signals are summed with I and Q error signals to produce a corrected I and Q signals. The corrected I and Q signals are used in modulating a carrier wave to produce a substantially constant envelope IQ modulated carrier, having some predistortion. The transmitter commences amplifying the constant envelope IQ modulated carrier at a power amplifier to produce an output signal. The output signal is sampled to produce a sampled signal. The feedback loop facilitates demodulating the sampled signal with an orthogonal frequency division multiplexed (OFDM) receiver to produce the I error and Q error signals.

Referring now to FIG. 3, there is shown therein a flow chart diagram of a method 300 of operating a multi-mode mobile communication device, in accordance with an embodiment of the invention. The method starts 302 with the multi-mode mobile communication device powered on and ready to engage in communication using a constant envelope carrier modulation air interface. The device must determine if the WLAN transceiver is presently in use (304). If the WLAN transceiver is presently being used for WLAN activity, then the device allows the WLAN activity to commence (306) with the WLAN activity. When the WLAN transceiver is not presently engaged in WLAN activity, and the device is ready to commence constant envelope modulation communication (308), the device commences setting up the feedback loop. If the constant envelope signal is at a frequency outside a prescribed frequency band for WLAN operation, the device must program a frequency shifter (310) to adjust the frequency of the sampled signal being fed back to the WLAN transceiver module. The device may also program the WLAN transceiver's operating frequency (312). The operating frequency of the WLAN may be set to specified offset from the sampled signal's frequency as received at the WLAN module so that an IF signal results in the WLAN module. In addition to setting the WLAN transceiver frequency, the device may set the WLAN transceiver's bandwidth (314). In one embodiment of the invention, the bandwidth may be set to less than 20 MHz. Restricting the bandwidth allows the WLAN transceiver to use less power. The WLAN transceiver processes the signal by digitizing the IF signal, generating I and Q digital signals, and converting the digital I and Q signals to analog I and Q error signals which are summed with the I and Q baseband signals generated by the back end of the multi-mode communications transceiver (316). The device may also periodically perform loop training (318) for phase correction to adjust for changes in loop characteristics that may occur due to temperature changes, for example. Upon completing the training, the loop is closed (320), and normal transmitter operation commences.

This invention can be embodied in other forms without departing from the spirit or essential attributes thereof. Accordingly, reference should be made to the following claims, rather than to the foregoing specification, as indicating the scope of the invention.

What is claimed is:

1. A multi-mode communication device, comprising:
   a multi-mode transceiver including a quadrature modulator, the multi-mode transceiver capable of transmitting both amplitude modulated signals and constant envelope angle modulated signals alternatively;
   a Cartesian feed back path selectably coupled between transmitter output and a back end module of the of the multi-mode transmitter for providing quadrature feedback when the multi-mode transmitter is transmitting the amplitude modulated signals; and
   a wireless local area network (WLAN) transceiver for accessing a wireless local area network, and selectably coupled between the transmitter output and the back end module of the of the multi-mode transmitter for providing quadrature feedback when the multi-mode transmitter is transmitting the constant envelope angle modulated signals.

2. A multi-mode communication device as defined in claim 1, further comprising a frequency converter selectably coupled between the transmitter output of the multi-mode transmitter and the WLAN transceiver, and wherein the WLAN transceiver operates at a prescribed frequency band, the frequency converter shifts a frequency of a sampled signal sampled from the transmitter output of the multi-mode transmitter to a frequency within the prescribed frequency band.

3. A multi-mode communication device as defined in claim 1, wherein the WLAN transceiver is programmable to be bandwidth limited.

4. A multi-mode communication device as defined in claim 3, wherein the multi-mode transceiver comprises:
   an IQ signal source which generates an I baseband signal and a Q baseband signal from a circular IQ constellation;
   a summing junction which sums the I baseband signal with an I error signal to produce a corrected I signal, and which sums the Q baseband signal with an Q error signal to produce a corrected Q signal;
   an IQ modulator which modulates a carrier wave with the corrected I and Q signals to produce a constant envelope IQ modulated carrier;
   an amplifier which amplifies the constant envelope IQ modulated carrier to produce an output signal; and
   a directional coupler which samples the output signal to produce a sampled signal,
   wherein the WLAN transceiver is an orthogonal frequency division multiplexed (OFDM) transceiver module selectively coupled to the directional coupler to receive the sampled signal and produce the I error and Q error signals.

5. A multi-mode communication device as defined in claim 4, wherein the IQ signal source generates the I and Q baseband signals by applying a digitized voice signal to the circular IQ constellation.

6. A multi-mode communication device as defined in claim 4, wherein the OFDM transceiver module produces an intermediate frequency (IF) signal from the sampled signal and performs frequency demodulation of the IF signal.

7. A multi-mode communication device as defined in claim 2, wherein the frequency converter is a harmonic generator for generating a harmonic of the sampled signal, and wherein the harmonic of the sampled signal is within the prescribed frequency band.

* * * * *